3,022,355
$\alpha^1,\alpha^3,\alpha^5$-TRIHYDROXYHEXAMETHYLBENZENE

Harold W. Earhart and William G. De Pierri, Jr., Baytown, Tex., assignors, by mesne assignments, to Esso Research and Engineering Company, Elizabeth, N.J., a corporation of Delaware
No Drawing. Filed July 14, 1959, Ser. No. 826,925
1 Claim. (Cl. 260—618)

This invention relates to a new chemical. More particularly, this invention relates to a new hydroxyl group-containing chemical characterized by superior thermal stability.

Polyhydroxy aromatic compounds find utility for a wide variety of purposes, including the preparation of alkyd resins, the preparation of polyester-type plastics, the preparation of synthetic fibers, etc. One of the problems encountered with the use of compounds of this nature is the susceptibility of the compounds to thermal decomposition. As a consequence, reactions involving such compounds must be conducted at comparatively mild temperatures and pressures and, moreover, the products that are formed are restricted in utility because of the susceptibility to thermal decomposition.

In accordance with the present invention there is provided a highly reactive, thermally stable polyhydroxy aromatic monomer which is of utility in the preparation of thermally stable esterification products.

The new monomer of the present invention is $\alpha^1,\alpha^3,\alpha^5$-trihydroxyhexamethylbenzene. The monomer is extremely resistant to thermal decomposition. Thus, for example, it may be heated to temperatures of about 300° C. and even higher without thermal decomposition. Surprisingly, the thermal stability is accompanied by high reactivity, whereby the monomer may be reacted with comparative ease. Thus, esterification reactions involving monocarboxylic acids or polycarboxylic acids may be conducted in accordance with known procedures. However, much more severe reaction conditions may be utilized than is normally possible because of the thermal stability of the new monomer. Thus, elevated temperatures in excess of about 270° C. and elevated pressures in excess of about 100 p.s.i.g. may be utilized without harmful effects. As a consequence, desired chemical reactions may be driven to completion with much shorter reaction times.

The invention will be illustrated by the following specific examples which are given by way of illustration and not as limitations on the scope of this invention.

Example I $\alpha^1,\alpha^3,\alpha^5$-trichlorohexamethylbenzene was reacted with sodium acetate in acetic acid at the reflux temperature for 24 hours and the resulting ester, $\alpha^1,\alpha^3,\alpha^5$-triacetoxyhexamethylbenzene was separated from the solvent by dilution of the solvent with water. The ester which was recovered was a white solid, sublimed 150° C., M.P. 158°–159° C.

The ester was hydrolyzed using 20 percent KOH by refluxing for 6 hours with stirring. The material which was recovered was recrystallized from ethanol. The white crystals which resulted had a melting point of 277° to 279° C. The infrared spectrum indicated complete hydrolysis of the ester and complete elimination of the Cl groups.

The analysis for the intermediate $\alpha^1,\alpha^3,\alpha^5$-triacetoxyhexamethylbenzene was as follows:

Analysis, $C_{18}H_{24}O_6$.—Calc.: C, 64.27; H, 7.19; O, 28.54. Found: C, 64.37; H, 7.36.

The final product, the monomer of the present invention, has the following structural formula:

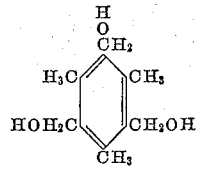

The analysis for the compound as prepared in accordance with Example I is as follows:

Analysis, $C_{12}H_{18}O_3$.—Calc.: C, 68.54; H, 8.62; O, 22.83. Found, C, 68.44; H, 8.58.

The $\alpha^1,\alpha^3,\alpha^5$-trichlorohexamethylbenzene starting material is prepared by the process disclosed and claimed in copending Earhart and De Pierri application Serial No. 826,994, filed of an even date herewith and entitled "Method for Chloromethylating Aromatic Hydrocarbons," now U.S. Patent 2,973,391, issued February 28, 1961.

Example II

Heat $\alpha^1,\alpha^3,\alpha^5$-trihydroxyhexamethylbenzene to a temperature of about 300° C. No observable decomposition occurs.

When $\alpha^2,\alpha^4$-dihydroxy-1,2,4,5-tetramethylbenzene is heated to this temperature, thermal decomposition occurs.

In a similar manner, thermal decomposition occurs when $\alpha^2,\alpha^4$-dihydroxy-1,2,3,4,5-pentamethylbenzene is heated to a temperature of about 300° C.

What is claimed is:
$\alpha^1,\alpha^3,\alpha^5$-trihydroxyhexamethylbenzene.

References Cited in the file of this patent
UNITED STATES PATENTS
2,542,417   Kleinschmidt _____ Feb. 20, 1951

OTHER REFERENCES
Nauta et al.: Rec. Trav. Chim., vol. 55 (1936), 1000–1006 (7 pages).